United States Patent
Ilyama et al.

(10) Patent No.: US 6,332,448 B1
(45) Date of Patent: Dec. 25, 2001

(54) FUEL SUPPLY APPARATUS OF INTERNAL COMBUSTION ENGINE

(75) Inventors: Akihiro Ilyama, Zushi; Hiroshi Miyakubo, Yokosuka, both of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/584,403

(22) Filed: Jun. 1, 2000

(30) Foreign Application Priority Data

Jun. 1, 1999 (JP) .................................................. 11-154089

(51) Int. Cl.$^7$ .............................. F02M 43/00; F02B 7/02
(52) U.S. Cl. ........................................... 123/304; 123/577
(58) Field of Search ................................... 123/575, 577, 123/1 A, 304

(56) References Cited

U.S. PATENT DOCUMENTS

| | | | |
|---|---|---|---|
| 3,851,633 | * 12/1974 | Shih | 123/576 |
| 3,985,108 | 10/1976 | Matsumoto et al. | 123/3 |
| 4,031,864 | 6/1977 | Crothers | 123/1 A |
| 4,462,944 | * 7/1984 | Sprick | 123/575 |
| 4,495,930 | * 1/1985 | Nakajima | 123/575 |
| 4,553,519 | * 11/1985 | Masson | 123/577 |
| 4,706,630 | 11/1987 | Wineland et al. | 123/478 |
| 4,884,530 | * 12/1989 | Boekhaus et al. | 123/575 |
| 5,233,944 | * 8/1993 | Mochizuki | 123/575 |
| 5,357,908 | * 10/1994 | Sung et al. | 123/576 |
| 5,469,830 | * 11/1995 | Gonzalez | 123/575 |
| 5,775,308 | * 7/1998 | Headley | 123/575 |
| 6,119,637 | * 9/2000 | Matthews et al. | 123/576 |

FOREIGN PATENT DOCUMENTS

| | | |
|---|---|---|
| 197 34493 | 11/1998 | (DE) . |
| 2 209 796 | 5/1989 | (GB) . |
| 2 330 176 | 4/1999 | (GB) . |
| 6-010787 | 1/1994 | (JP) . |
| 6-307307 | 11/1994 | (JP) . |
| 9-242520 | 9/1997 | (JP) . |
| 2000-73797 | 3/2000 | (JP) . |

* cited by examiner

*Primary Examiner*—Erick Solis
(74) *Attorney, Agent, or Firm*—Foley & Lardner

(57) ABSTRACT

In a fuel supply device which supplies fuel in a main tank (8) to a vehicle engine (20), a fractional distiller (9) fractionates the fuel in the main tank (8) into a high octane fuel component and a low octane fuel component, and stores these fuel components in subtanks (10, 11). The high octane fuel component is supplied by a high pressure intermittent pump (16), and the low octane fuel component is supplied by a variable pressure pump (15), to a fuel injector (17) of the engine (20). A controller (1) identifies a running region by the rotation speed and load of the engine (20), determines the proportion of fuel components supplied to the engine (20) according to the identified running region and controls a discharge pressure of the variable pressure pump (15) so that the determined proportion is achieved. When the storage amount of one of the subtanks (10, 11) falls below a minimum value, the proportion of fuel components supplied to the engine (20) from the other subtank (11, 10) is increased.

16 Claims, 10 Drawing Sheets

FUEL SUPPLY APPARATUS OF INTERNAL COMBUSTION ENGINE

FIELD OF THE INVENTION

This invention relates to a fuel supply apparatus which supplies two or more kinds of fuel to an engine according to running conditions.

BACKGROUND OF THE INVENTION

Tokkai Hei 6-10787 published by the Japanese Patent Office in 1994 discloses a technique wherein main fuel and auxiliary fuel are injected by one nozzle to supply two kinds of fuel to an internal combustion engine for vehicles of a compression self-ignition type. This nozzle is filled with the auxiliary fuel at the tip, and injects the auxiliary fuel prior to a main fuel injection.

Tokkai Hei 6-307307 published by the Japanese Patent Office in 1994 discloses control of the injection proportion of two kinds of fuel. Alcohol is used for the main fuel, a diesel fuel is used for the auxiliary fuel, and the supply proportion of the main fuel and the auxiliary fuel is controlled by varying the amount of auxiliary fuel which fills the tip of the nozzle.

This aims to improve the ignition characteristics of an engine which uses alcohol as a main fuel.

That is, by first injecting the diesel fuel which has better ignition characteristics than alcohol, the diesel fuel undergoes compression ignition first, and the flame then spreads to the alcohol, the main fuel.

Also in a gasoline engine which changes over between compression self-ignition combustion and spark ignition combustion according to running conditions, the air-fuel ratio region in which self-ignition combustion is possible can be expanded by using two kinds of fuels in this way.

Compression self-ignition combustion is effective in largely reducing fuel consumption to enable combustion with a very lean air-fuel ratio. However, combustion stability tends to decline under such a lean air-fuel ratio, while on the other hand at a rich air-fuel ratio, knocking easily occurs. Therefore, if high octane fuel which is effective in preventing knocking is used to allow self-ignition combustion more easily, while low octane fuel which has high combustion stability is used at a lean air-fuel ratio, the self-ignition combustion region can be enlarged.

However, having two kinds of fuel tanks for this purpose increases the manufacturing cost of a vehicle. Further, as which of these fuels is used the most depends on running conditions, it is difficult to use up both of the fuels simultaneously, and the frequency of refuelling also increases as a result.

It is therefore an object of this invention to enable supply of plural fuels to an engine without increasing the frequency of refuelling.

In order to achieve the above object, this invention provides an apparatus for supplying fuel in a fuel tank to an internal combustion engine, comprising a separating device which separates fuel in the fuel tank into plural fuel components, a sensor which detects a running condition of the engine, and a mechanism which supplies the plural fuel components to the engine in different proportions depending on the running condition.

The details as well as other features and advantages of this invention are set forth in the remainder of the specification and are shown in the accompanying drawings.

DESCRIPTION OF THE PREFERRED EMBODIMENTS

Figure 1:
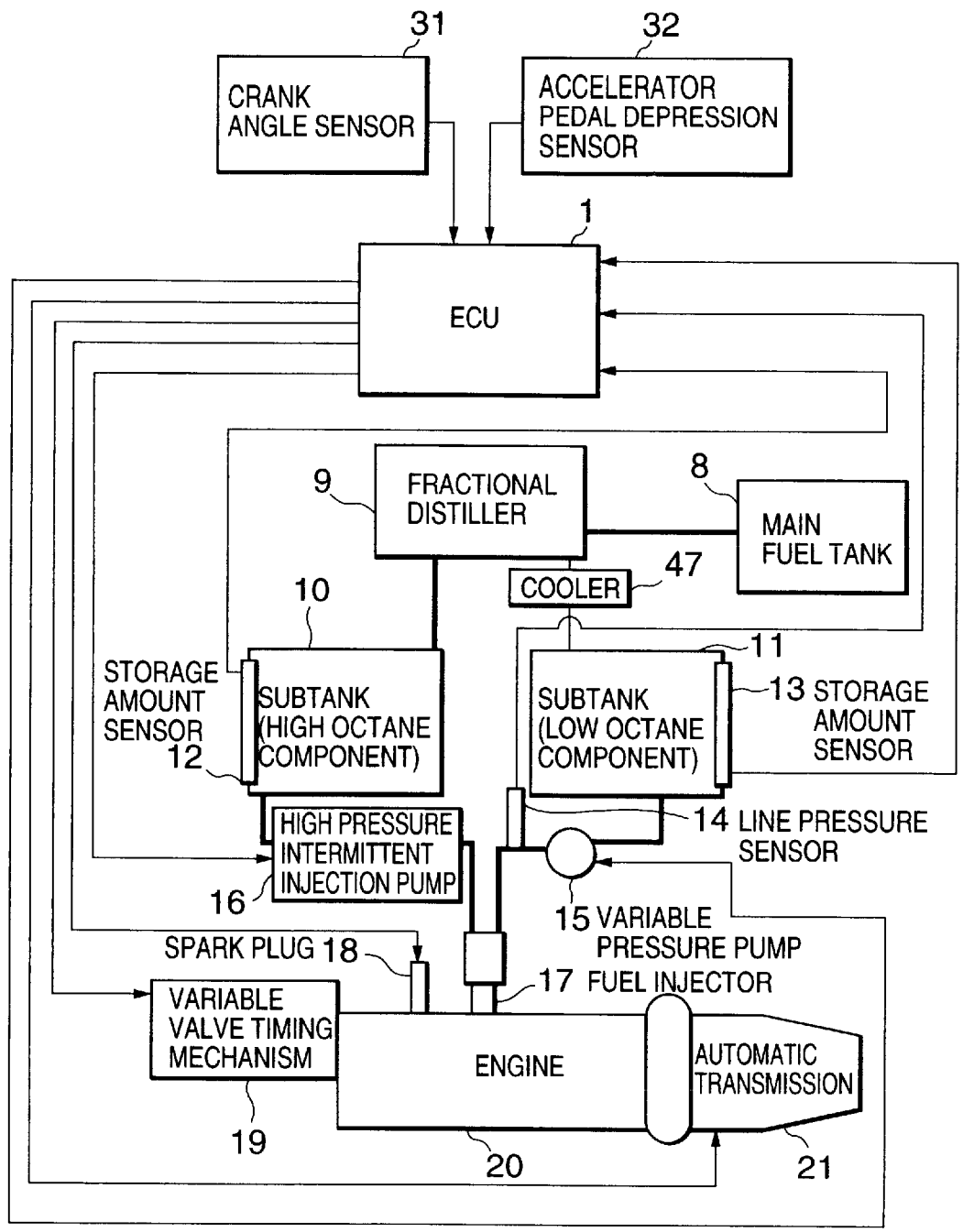
FIG. 1 is a schematic diagram of a fuel supply apparatus according to this invention.

Referring to FIG. 1 of the drawings, in a four stroke cycle gasoline engine 20 for vehicles, signals are output from a controller 1 to a spark plug 18, fuel injector 17 and variable valve mechanism according to running conditions. Due to these signals the engine 20 changes over between compression self-ignition combustion and spark ignition combustion according to running conditions. The rotation output of the engine 20 is transmitted to the drive wheels of the vehicle via an automatic transmission 21. The speed ratio of the automatic transmission 21 is also controlled by a signal from the controller 1.

The fuel supply to the fuel injector 17 of the gasoline engine 20 is supplied from a main fuel tank 8 firstly to a fractional distiller 9. The fractional distiller 9 first distills the fuel into high boiling point, high octane fuel components and low boiling point, low octane fuel components according to the difference in the boiling point of fuel components. The high octane fuel components produced as a result are stored by a subtank 10, and the low octane fuel components are stored by a subtank 11.

The high octane fuel conponents of the subtank 10 are supplied to a fuel injector 17 at a constant pressure via a high pressure intermittent injection pump 16. The low octane fuel components of the subtank 11 are supplied to the fuel injector 17 via a variable pressure pump 15.

Figure 6:
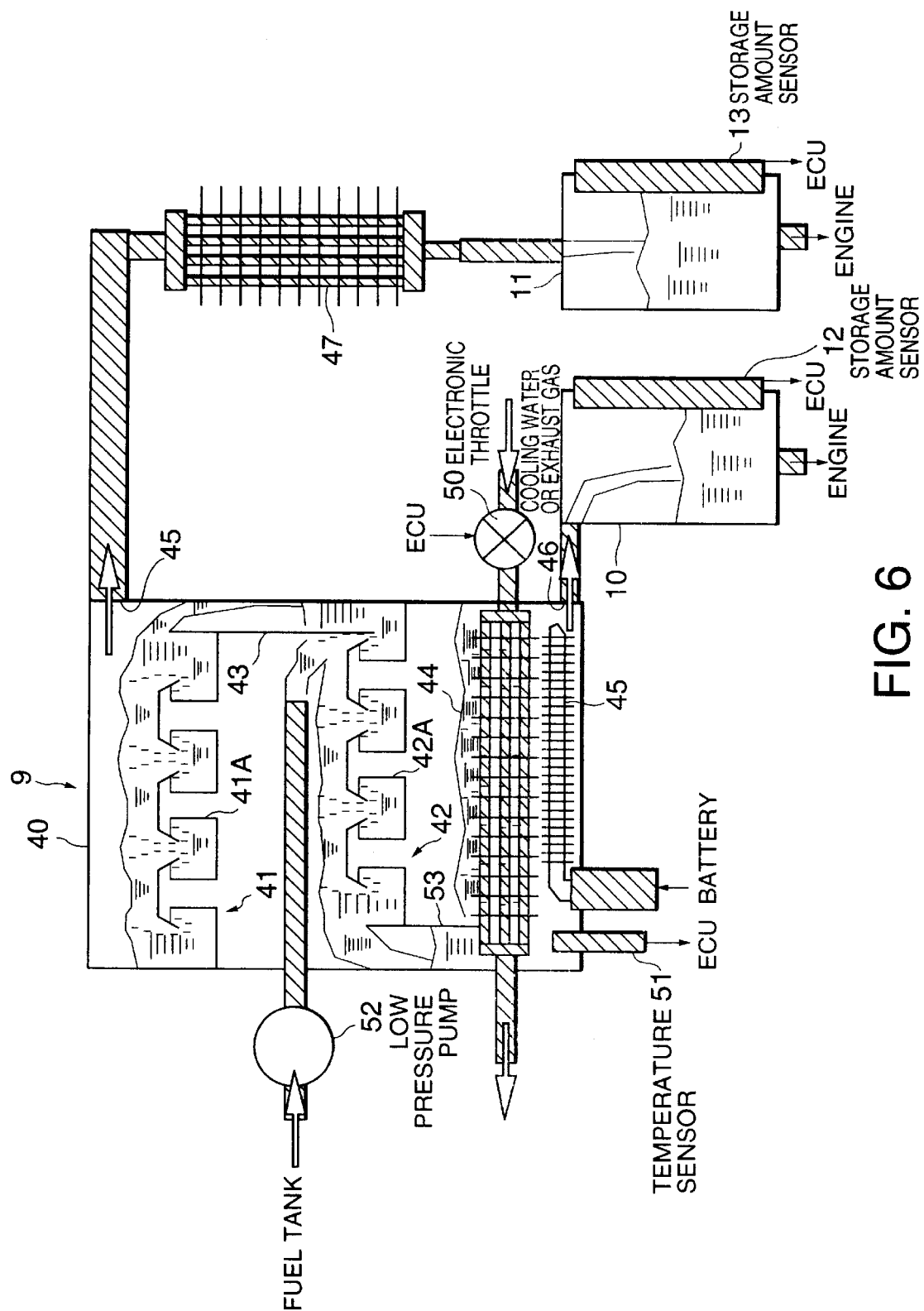
FIG. 6 is a schematic diagram of a fractional distiller according to this invention.

Next, the construction of the fractional distiller 9 will be described referring to FIG. 6.

The fractional distiller 9 comprises two trays 41 and 42 in a case 40. Small holes are respectively formed in each of the trays 41, 42, and fuel which has fallen from the holes is collected in storage containers 41A, 42A, respectively.

The gasoline of the main fuel tank 8 is supplied to the trays 41, 42 in the case 40 via a low pressure pump 52. The trays 41, 42 are connected in a case 40 via a duct 43 disposed in the vertical direction. An outlet 45 which removes low boiling point fuel components as vapor is provided on the upper edge of the case 40. An outlet 46 which removes high boiling point components in the gasoline as a liquid is provided on the bottom edge of the case 40. The vapor of low boiling point components flowing out of the outlet 45 is cooled by an air-cooling cooler 47, and flow into the subtank 11 as liquefied low octane fuel. Liquid of high boiling point components which have overflowed from the lower tray 42 collects on the base of the case 40, flows out of the outlet 46, and flows into the subtank 10 as high octane fuel.

In order to control the temperature within the case 40, a radiator 48 and electric heater 49 are installed underneath the tray 42 in the lower part of the case 40. A coolant of the engine 20 is led to the radiator 48 through an electronic throttle 50 controlled by the controller 1. The coolant may be replaced by the exhaust gas of the engine 20.

The electric heater 49 generates heat according to electric power supplied from a battery mounted on the vehicle. A temperature sensor 51 which detects an internal temperature, i.e., fractionation temperature, is provided in the case 40, and the detected temperature is input into the controller 1 as a signal.

By controlling the opening of the electronic throttle 50 and energization of the electric heater 45 based on the detected temperature, the controller 1 maintains the interior of the case 40 at a predetermined fractionation temperature.

Specifically, as the coolant temperature is low when the engine 20 starts, the fractionation temperature is obtained using the electric heater 49. After warm-up of the engine 20 is complete, the fractionation temperature is maintained by heat dissipation of the radiator 48. The heat release of the radiator 48 is controlled by operation of the electronic throttle 50 performed by the controller 1.

Thus, if the interior of the case 40 is maintained at 80 degrees C., for example, the boiling point of low boiling point components which boil at 80 degrees C. or less in the gasoline led into the case 40 will boil and vaporize. The vapor of low boiling point components moves upwards from the ducts 43 inside the case 40, part flows out the outlet 45, and part liquefies on contact with the upper tray 41 or the liquid that has collected on the upper tray 41, and falls into the storage containers 41A of the tray 41. The liquid in the storage containers 41A also boils, and the vapor of the low boiling point components vaporized from this also flows out of the outlet 45.

On the other hand, high boiling point components in the gasoline led into the case 40 collect in the lower tray 42, and a liquid comprising high boiling point components which overflowed from the tray 42 flows out of the outlet 46 through the bottom of the case 40 through a duct 53. In this way, the gasoline is fractionated into low octane fuel comprising low boiling point components, and high octane fuel comprising high boiling point components. A storage amount sensor 12 which detects the storage amount of high octane fuel is attached to the subtank 10 which stores high octane fuel, and the detected fuel storage amount is input to the controller 1 as a signal.

A storage amount sensor 13 which detects the storage amount of low octane fuel is attached to the subtank 11 which stores low octane fuel, and the detected fuel storage amount is input to the controller 1 as a signal.

When gasoline with a research octane number (RON) of 100 is fractionated at 80 degrees C., the volume of high molecular weight, high boiling gasoline components with a high octane number of RON10, 8, i.e., high octane fuel, which is obtained is 45% by volume of the original gasoline, and the volume of low molecular weight, low boiling gasoline components with a low octane number of RON94, i.e., low octane fuel, which is obtained is 55% by volume of the original gasoline.

The fractionation device 9 is designed so that the fractionation capacity of high octane fuel and low octane fuel exceeds the amount of gasoline consumed at the time of peak load of the engine 20.

Referring again to FIG. 1, a fuel line pressure sensor 14 is disposed in a fuel passage between the variable pressure pump 15 and the fuel injector 17, and the detected fuel line pressure is input to the controller 1 as a signal.

In addition to the aforesaid signals, a signal from a crank angle sensor 31 which detects the rotation position and rotation speed of the engine 20, and an accelerator pedal depression sensor 32 which detects a depression amount of an accelerator pedal, are input to the controller 1. The accelerator pedal depression amount is used as a value representing the load of the engine 20.

Based on the load and rotating speed of the engine 20, the controller 1 determines the running region and determines the operating proportion or mixing ratio of high octane fuel and low octane fuel. In order to realize combustion conditions according to the operating range, the open/close timings of intake valves and exhaust valves of the engine 20 are changed via a variable valve mechanism 19. Further, the injection amount of fuel injected by the fuel injector 17 and usage ratio or blending ratio of high octane fuel and low octane fuel are controlled by controlling the residual pressure of the high pressure intermittent pump 16, and the pressure of the variable pressure pump 15. The speed ratio of the automatic transmission 21 is also controlled, and the temperature of the fractional distiller 9 is controlled as mentioned above.

Figure 2:
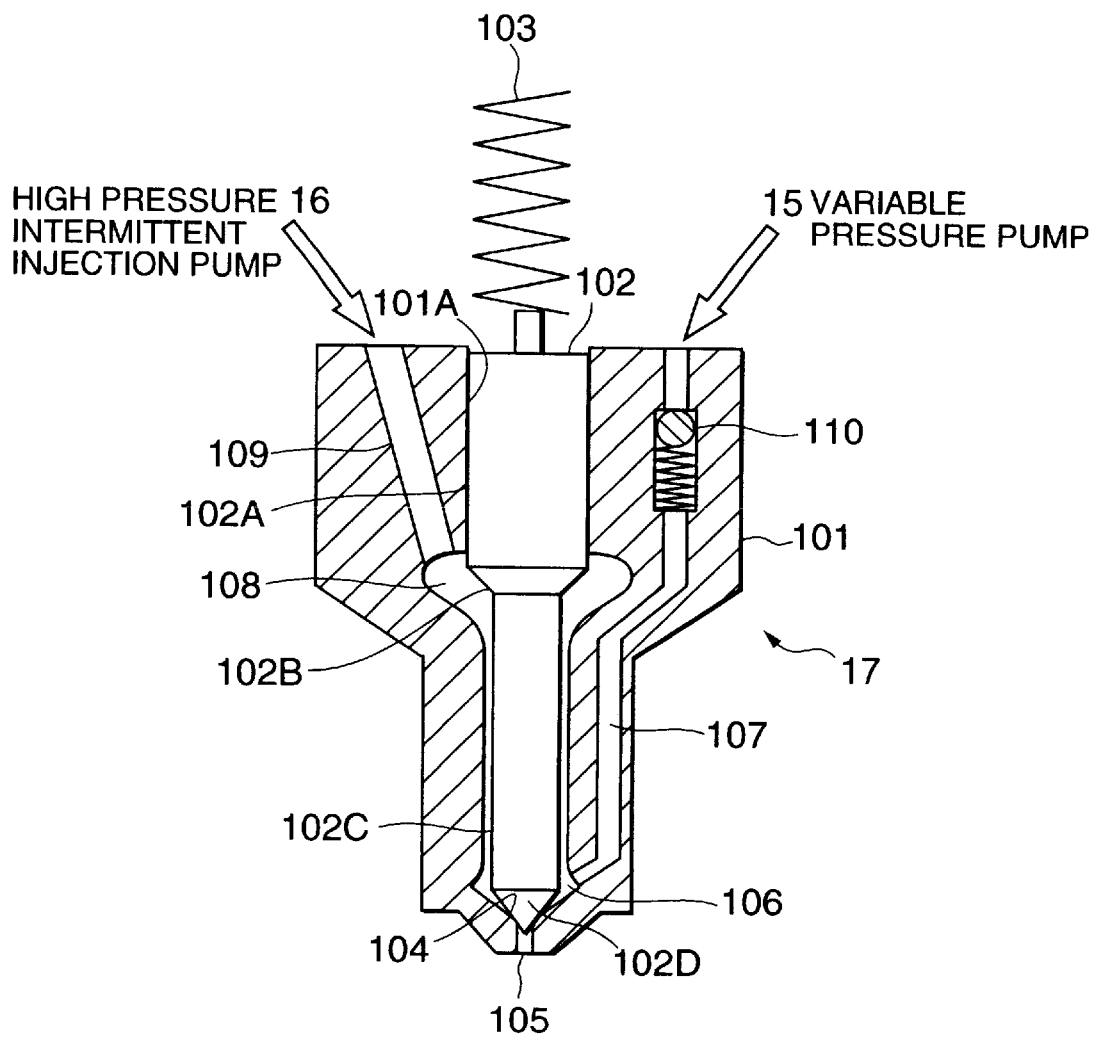
FIG. 2 is a longitudinal sectional view of a fuel injector according to this invention.

Next, the construction of the fuel injector 17 will be described referring to FIG. 2.

The fuel injector 17 comprises a needle valve 102, spring 103 which pushes the needle valve 102 in the closing direction, and a check valve 110 inside a valve body 101. The needle valve 102 comprises a large diameter part 102A which slides in a slide hole 101A formed in the vertical direction of the valve body 101, a small diameter part 102C formed underneath the large diameter part 102A, a taper part 102B which connects these parts, and conical part 102D formed at the tip of the small diameter part 102C.

An injection port 105 opens at the tip of the valve body 101, this injection port being closed by the conical part 102B coming in contact with a valve seat 104 on the rear side of the injection port 105.

An upper fuel collector 108 surrounding the taper part 102B and a tip fuel collector 106 surrounding the tip of the small diameter part 102C, are formed in the valve body 101. A fuel passage 107 which connects the tip fuel collector 106 to the variable pressure pump 15 through the check valve 110, and a fuel passage 109 which connects the upper fuel collector 108 to the high pressure intermittent pump 16, are also formed.

The viscosity coefficient of high octane fuel is higher than the viscosity coefficient of low octane fuel, and its lubricating properties at high pressure are fairly excellent. Therefore, high octane fuel is used also for lubrication between the slide hole 101A of the valve body 101, and the large diameter part 102A.

High octane fuel reaches high pressure intermittently due to the high pressure intermittent injection pump 16. An upward force which the fuel pressure of the upper fuel collector 108 exerts on the taper part 102B under high pressure overcomes the pressing force of the spring 103, and lifts the needle valve 102. Thus, the conical part 102B separates from the valve seat 104, the fuel injector 17 opens and fuel is injected. In this way, the needle valve 10 lifts intermittently according to the discharge pressure of the high pressure intermittent injection pump 16 which is intermittently at high pressure.

On the other hand, low octane fuel is supplied to the tip fuel collector 106 via the fuel passage 107 from the variable pressure pump 15. If the supply pressure of low octane fuel is higher than the residual pressure when intermittent injection of high octane fuel is complete, a large amount of low octane fuel collects in the tip fuel collector 106 and low octane fuel is injected first when the needle valve 102 next opens.

Conversely, if the supply pressure of low octane fuel is equal to or less than the residual pressure when intermittent injection of high octane fuel is complete, low octane fuel does not collect in the tip fuel collector 106 of the fuel injector, and most of the fuel injected when the needle valve 102 opens is high octane fuel. The injection proportion of high octane fuel and low octane fuel can therefore be adjusted depending on the supply pressure of low octane fuel.

The injection amount of the fuel injector 17 varies according to the load. In this invention, after the controller 1 determines the injection amount, the proportion of high octane fuel and low octane fuel in the injected fuel is determined, and the residual pressure of the high pressure intermittent injection pump 16 or the discharge pressure of the variable pressure pump 15 is determined so that the determined proportion is realized.

The high pressure period of the high pressure intermittent injection pump 16 is equal to the valve opening period of the needle valve 102. Therefore, the total injection amount of high octane fuel and low octane fuel is determined by the high pressure period of the high pressure intermittent injection pump 16.

As a result, it is possible to control the fuel injection amount and the proportion of high octane fuel to low octane fuel in the injection amount by controlling the high pressure period of the high pressure intermittent injection pump 16, and either of the residual pressure of the high pressure intermittent injection pump 16 or the discharge pressure of the variable pressure pump 15. This control is effective both in the case when the fuel injector 17 injects fuel into the intake port of the engine, and the case when it injects fuel directly into the cylinder.

Figure 3:
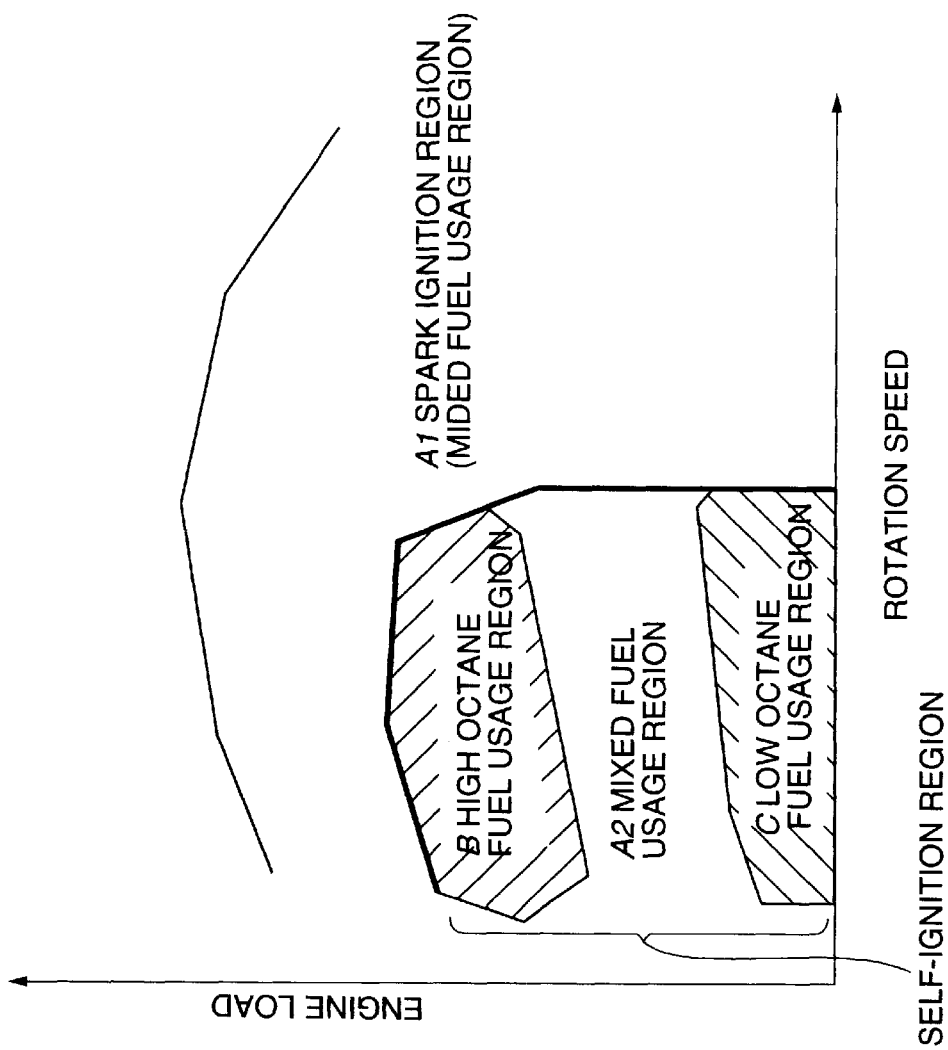
FIG. 3 is a diagram describing combustion types of an internal combustion engine to which this invention is applied, and fuels used.

The controller 1 determines a spark ignition region (A1) and a self-ignition region by looking up a map shown in FIG. 3 based on the load and rotation speed of the engine 20, and distinguishes a high octane fuel usage region B, mixed fuel usage region A2, and low octane fuel usage region C when the running conditions have been determined to correspond to the self-ignition region.

The map of FIG. 3 is stored beforehand in a ROM of the controller 1.

The three regions B, A2 and C in the self-ignition region are distinguished by the load of the engine 20.

In the regions A1, A2, high octane fuel or low octane fuel may be used, or these can be blended with an arbitrary mixing ratio. In the region B, due to the high load, high octane fuel which seldom causes knocking is used, and in the region C, due to the low load, low octane fuel which has excellent combustion stability is used.

Now, the characteristics of three regions B, A2 and C in the self-ignition region will be described in detail. In the high octane fuel usage region B which corresponds to high engine loads, the self-ignition range is limited by knocking, so it is desirable to increase the octane number of the fuel, to make the compression ratio low, and to decrease the internal exhaust gas recirculation (EGR) amount. On the other hand, in the low load region C which corresponds to low engine loads, it is desirable to lower the octane number of the fuel, to make the compression ratio high, and to increase the internal EGR amount in order to promote self-ignition of the lean air-fuel mixture. In the region A2, it is desirable that the fuel octane number, compression ratio and internal EGR amount are at intermediate levels between those of the regions B and C. Of the above conditions, increase and decrease of compression ratio and internal EGR amount are achieved by changing the open/close timing of the intake valves and the exhaust valves via the variable valve mechanism 19.

Next, the variable valve mechanism 19 will be described. The variable valve mechanism 19 is a device with which the engine 20 is equipped for changing the open/close timings of the intake valves and the exhaust valves. The device disclosed by Tokkai Hei 9-242520 published by the Japanese Patent Office in 1997, or Tokkai 2000-73797 published by the Japanese Patent Office in 2000 can be used as the variable valve mechanism 19.

Figure 7A:
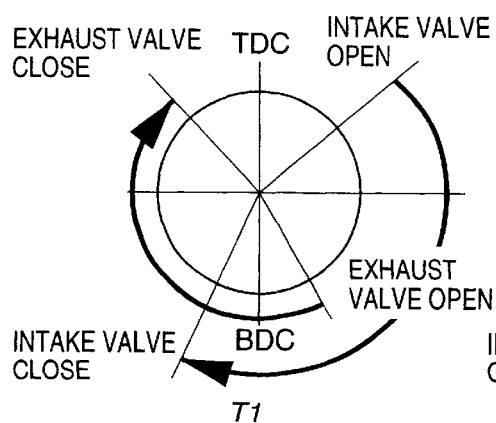
FIGS. 7A–7D are timing charts describing valve timings which the controller applies.
Figure 7B:
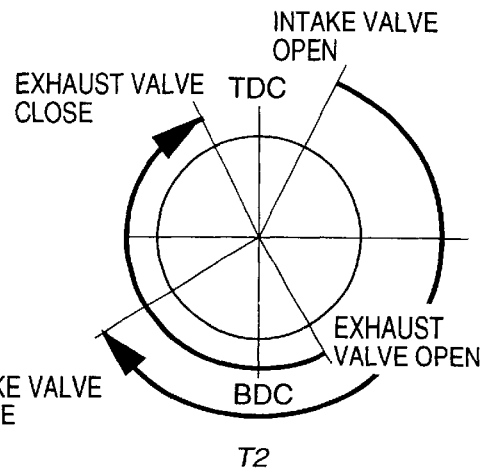
Figure 7C:
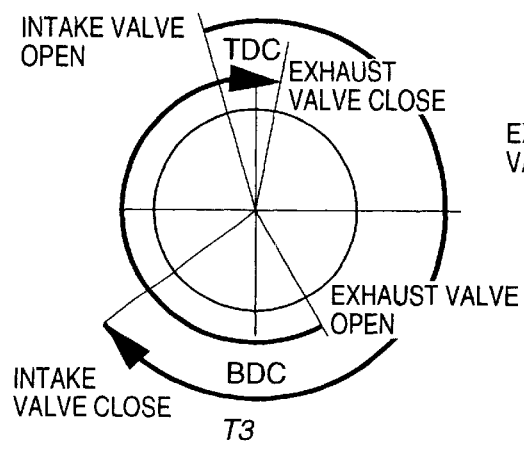
Figure 7D:
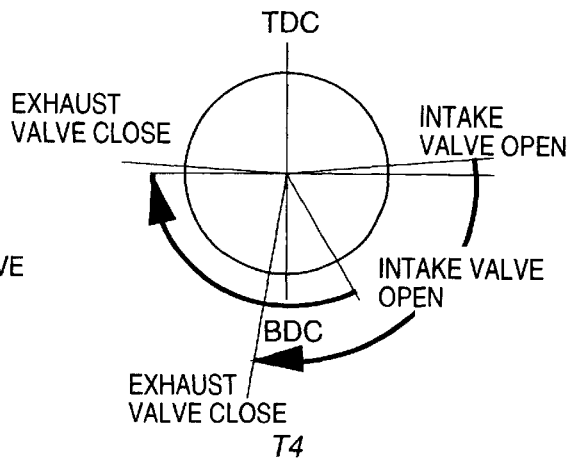

The variable valve mechanism 19 closes the exhaust valves in the middle of the exhaust stroke, and closes the intake valves in the middle of the intake stroke so as to provide a period when both the intake valves and exhaust valves are closed, or the close timing of the intake valves is delayed to reduce the effective compression ratio of the engine 20. Specifically, according to an input signal from the controller 1, four kinds of valve timings shown in FIGS. 7A–7D are applied alternately. In the region A1, a timing T3 shown in FIG. 7A is applied, in the region A2, a timing T1 shown in FIG. 7B is applied, in the region B, a timing T2 shown in FIG. 7C is applied, and in the region C, a timing T4 shown in FIG. 7D is applied.

Under compression self-ignition conditions, due to the operation of the variable valve mechanism 19, the controller 1 performs control of the residual gas amount in the engine, i.e., the internal exhaust gas recirculation amount (internal EGR amount) and control of the compression ratio to obtain the required temperature and pressure for compression self-ignition combustion.

Under spark ignition conditions, the controller 1 substantially reduces the compression ratio of the engine 20 in order to realize the compression ratio required for spark ignition.

In the low load region C, to promote self-ignition, the controller 1 performs energy supplementation of the air-fuel mixture by auxiliary sparking by the spark plug 18. This is to promote formation of active free radicals in the air-fuel mixture by auxiliary sparking of the spark plug 18 during or after fuel injection, and takes place subject to the condition that this sparking does not ignite the fuel.

Figure 4A:
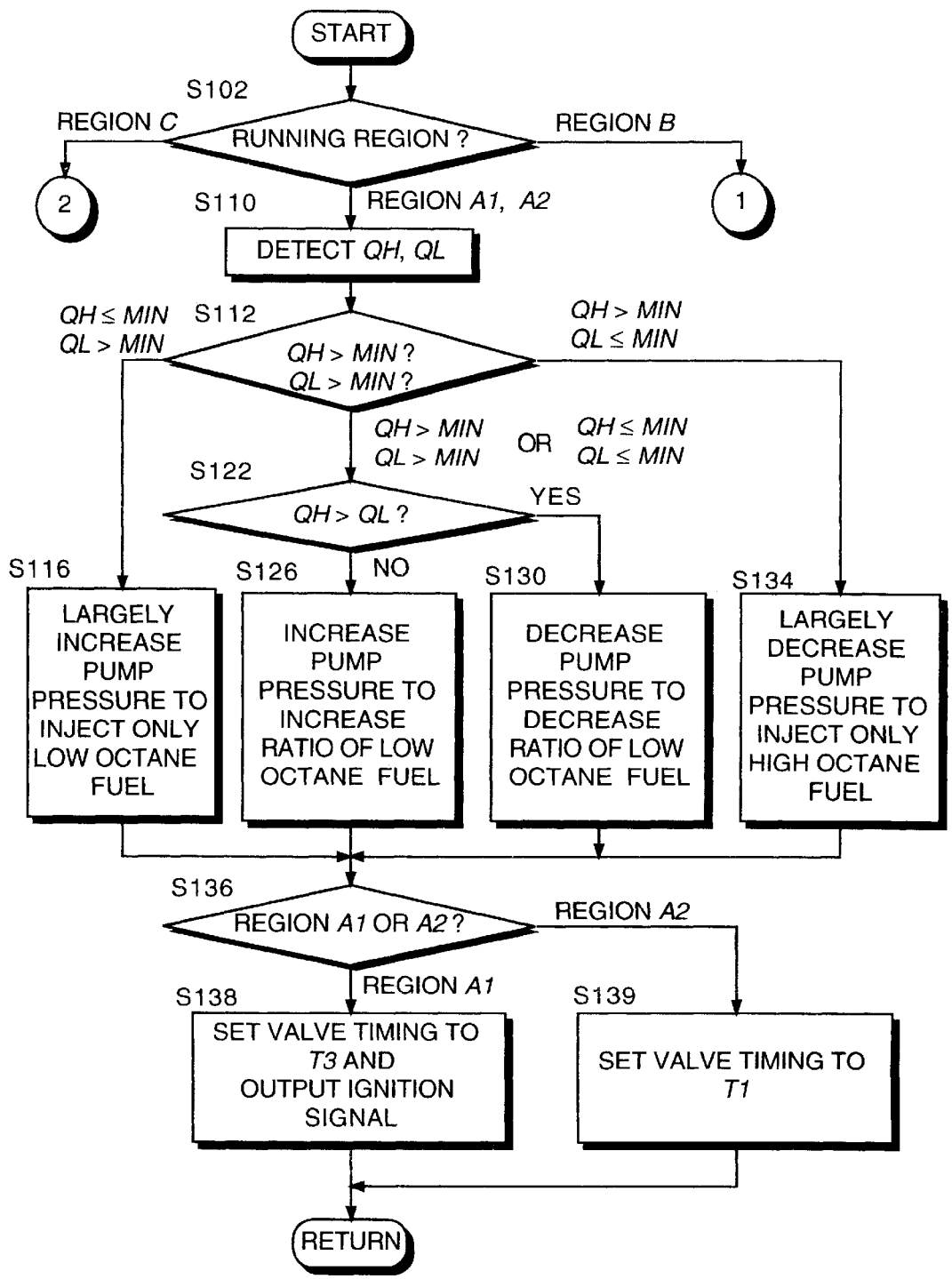
FIGS. 4A–4C is a flowchart describing a fuel supply control and combustion control performed by a controller according to this invention.

Next, the fuel supply to the engine 20 and combustion control of the engine 20 performed by the controller 1 will be described referring to the flowcharts of FIGS. 4A–4C. This control routine is performed at an interval of 10 milliseconds.

First, in a step S102, an operating range is identified based on the load and rotation speed of the engine 20 by looking up the map of FIG. 3. The load is calculated by adding a predetermined processing beforehand to an input signal from the accelerator pedal depression sensor 32. The rotation speed is calculated by adding a predetermined processing beforehand to an input signal from the crank angle sensor 31.

When the running region corresponds to either of the regions A1 or A2 in the step S102, the routine proceeds to a step S110. When the running region corresponds to the region B, the routine proceeds to a step S140 of FIG. 4B. When the running region corresponds to the region C, the routine proceeds to a step S170 of FIG. 4C.

In the step S110, a storage amount QH of the high octane fuel of the subtank 10 and a storage amount QL of the low octane fuel of the subtank 11 are read, based on input signals from the storage amount sensors 12 and 13. In a following step S112, the storage amounts QH and QL are compared with a minimum value MIN.

When only QH is equal to or less than the minimum value MIN of the storage amounts QH and QL, the routine proceeds to a step S116. Here, the discharge pressure of the variable pressure pump 15 is largely increased so that only low octane fuel is injected.

After this processing, the routine proceeds to a step S136.

When only QL is equal to or less than the minimum value MIN of the storage amounts QH and QL in the step S112, the routine proceeds to a step S134. Here, the discharge pressure of the variable pressure pump 15 is largely decreased so that only high octane fuel is injected.

After this processing, the routine proceeds to the step S136.

When neither of these cases is satisfied in the step S112, i.e., when both of the storage amounts QH, and QL are larger than the minimum value MIN or both are equal to or less than the minimum value MIN, the routine proceeds to a step S122. Here, it is determined whether or not the high octane fuel storage amount QH is larger than the low octane fuel storage amount QL.

If QH>QL, the routine proceeds to a step S130 and the discharge pressure of the variable pressure pump 15 is reduced to decrease the usage rate of low octane fuel. After this processing, the routine proceeds to the step S136.

On the other hand, if QH≦QL, the routine proceeds to a step S126 and the discharge pressure of the variable pressure pump 15 is increased so that the usage rate of low octane fuel is increased. After this processing, the routine proceeds to the step S136.

In the step S136, it is determined whether or not the running region of the engine 20 corresponds to the region A1, or corresponds to the region A2.

When it corresponds to the region A1 where spark ignition is performed, the routine sets the valve timing to the timing T3 for spark ignition in a step S138, outputs an ignition signal, and the routine is terminated.

When the running region corresponds to the region A2 where self-ignition is performed in the step S136, the routine sets the valve timing to the timing T1 for self-ignitions in a step S139, and the routine is terminated.

Thus, in the regions A1 and A2, if only one of the high octane fuel storage amount QH or the low octane fuel storage amount QL is equal to or less than the minimum value MIN, fuel injection will be performed using only the remaining storage amount. In other cases, the usage rate of the larger storage amount is increased.

Therefore, the usage rate of fuel is controlled so that the high octane fuel storage amount QH and the low octane fuel storage amount QL are always balanced.

Figure 4B:
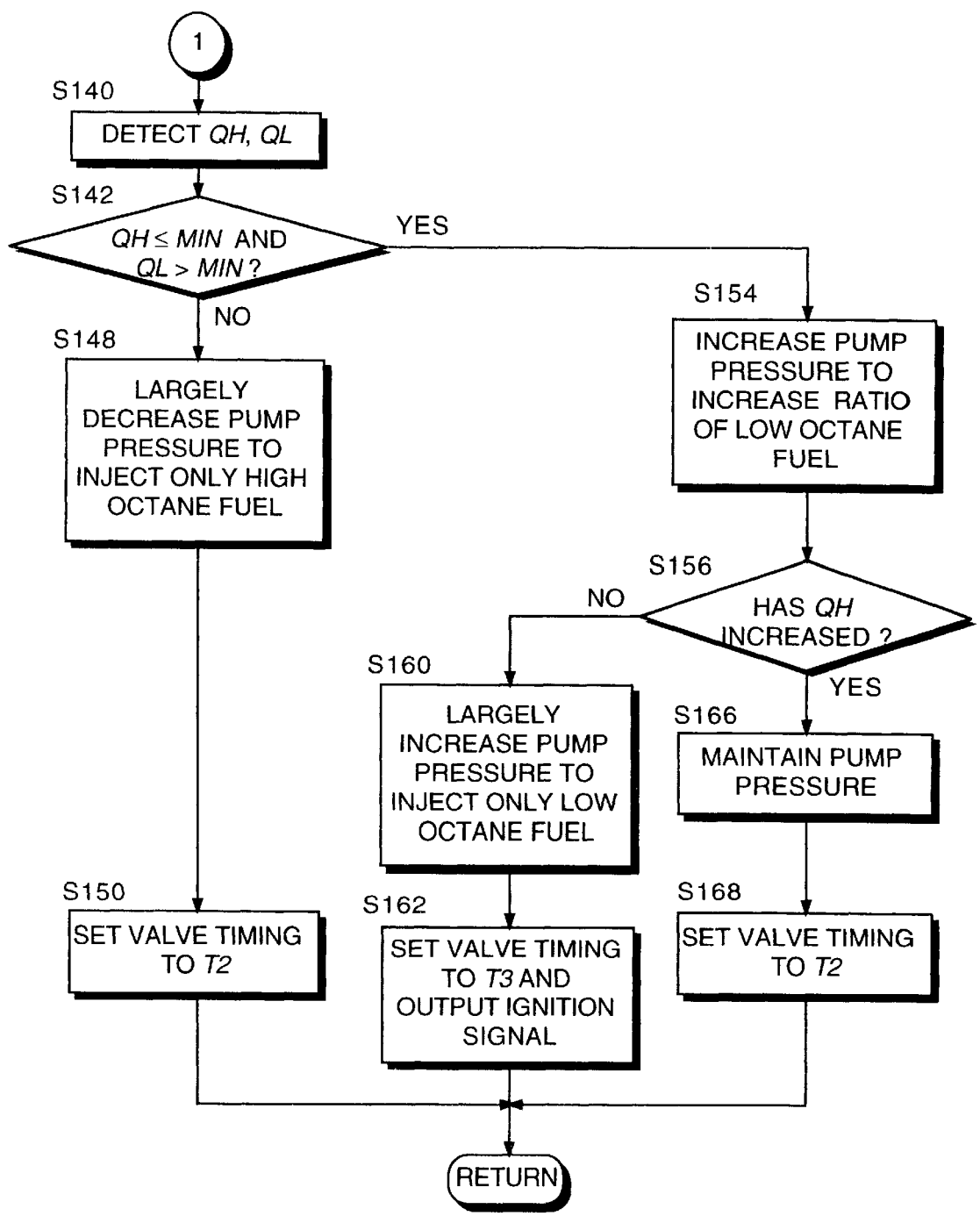

When the running region of the engine 20 corresponds to the region B in the step S102 as mentioned above, the routine proceeds to the step S140 of FIG. 4B.

In the step S140, the storage amount QH of the high octane fuel of the subtank 10 and the storage amount QL of the low octane fuel of the subtank 11 are read, based on input signals from the storage amount sensors 12 and 13.

In a next step S142, it is determined whether or not only the high octane fuel storage amount QH is equal to or less than the minimum value MIN.

If the determination result of the step S142 is negative, the routine proceeds to a step S148. Here, the discharge pressure of the variable pressure pump 15 is largely reduced so that only high octane fuel is injected. The valve timing is then set to the timing T2 for self-ignition in the region B in a step S150, and the routine is terminated.

When the determination result of the step S142 is affirmative, the routine proceeds to a step S154. Here, the discharge pressure of the variable pressure pump 15 is increased so that the usage rate of low octane fuel is increased. After this processing, the routine proceeds to a step S156.

In the step S156, it is determined whether or not the high octane fuel storage amount QH has increased.

When QH is increasing, in a step S166, the routine maintains the discharge pressure of the variable pressure pump 15 at the pressure set in the step S154, and the routine proceeds to a step S168.

In the step S168, the valve timing is set to the timing T2 for self-ignition the region B, and the routine is terminated.

On the other hand, when QH is not increasing in the step S156, the routine proceeds to a step S160. Here, the discharge pressure of the variable pressure pump 15 is largely increased so that only low octane fuel is injected. Subsequently, the valve timing is set to the timing T3 for spark ignition in a step S162, an ignition signal is output, and the routine is terminated. That is, in the region B where self-ignition combustion by high octane fuel should be performed, when only the high octane fuel storage amount QH is insufficient, the relative increase in the high octane fuel storage amount QH is promoted by performing spark ignition by low octane fuel without performing self-ignition.

Figure 4C:
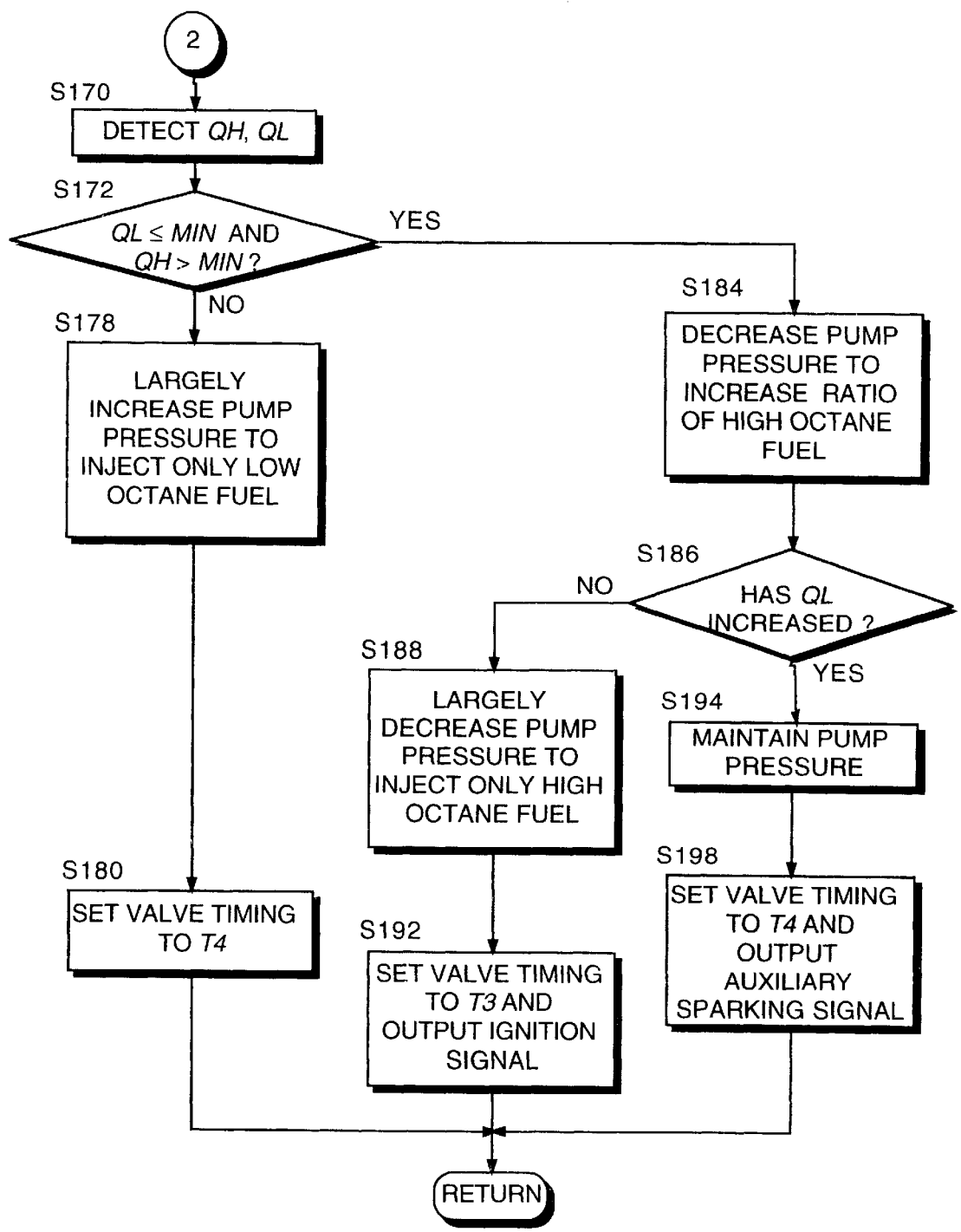

When the running region of the engine 20 corresponds to the region C in the step S102 mentioned above, the routine proceeds to the step S170 of FIG. 4C.

Here, the high octane fuel storage amount QH of the subtank 10 and the low octane fuel storage amount QL of the subtank 11 are read based on the input signals from the storage meters 12, 13.

In the following step S172, it is determined whether or not only the low octane fuel storage amount QL is equal to or less than the minimum value MIN.

If the determination result of the step S172 is negative, the routine proceeds to a step S178.

Here, the discharge pressure of the variable pressure pump 15 is largely increased so that only low octane fuel is injected corresponding to the region C.

After this processing, the valve timing is set to the timing T4 for self-ignition in the region C in a step S180, and the routine is terminated.

If the determination result of step S172 is affirmative, the routine proceeds to a step S184.

Here, the discharge pressure of the variable pressure pump 15 is reduced so that the usage rate of high octane fuel is increased. After this processing, the routine proceeds to a step S186.

In the step S186, it is determined whether or not the low octane fuel storage amount QL has increased.

When QL is increasing, in a step S194, the routine maintains the discharge pressure of the variable pressure pump 15 at the pressure set in the step S184, and the routine proceeds to a step S198.

In the step S198, the valve timing is set as the timing T4 for self-ignition in the region C, an auxiliary sparking signal is output, and the routine is terminated.

On the other hand, when QL is not increasing in the step S186, the routine proceeds to a step S188.

Here, the pressure of the variable pressure pump 15 is largely reduced so that only high octane fuel is injected. Subsequently, the valve timing is set as the timing T3 for spark ignition in a step S192, an ignition signal is output, and the routine is terminated. That is, in the region C where self-ignition combustion should be performed by low octane fuel, when only the low octane fuel storage amount QL is insufficient, relative increase in the low octane fuel storage amount QL is promoted by performing spark ignition by high octane fuel without performing self-ignition.

The low octane fuel storage amount QL and the high octane fuel storage amount QH are always controlled by performing the above routine in the balanced direction.

Therefore, the two kinds of fuel can be used effectively without exhausting one kind of fuel and leaving an excess of the other kind, and without increasing the number of times refueling of the main tank 8 is performed.

The volume yield of high octane fuel and low octane fuel is 45 to 55. In the processing of the steps S112, S122, S142 and S172 using the storage amounts QH, QL of the two subtanks 10, 11, a correction value which takes the volume yield into account may be used for each storage amount. For example, assume the real storage amount of high octane fuel is 0.9 QH and the real storage amount of low octane fuel is 1.1 QL. That is, consumption of high octane fuel can be suppressed by estimating the storage amount of high octane fuel, which has a low yield, to be low.

Moreover, it is also possible to set subtanks 10 and 11 to have different capacities, and to set the usage rate of high octane fuel and low octane fuel according to a map defined according to the difference in the capacities. That is, the map may for exanipie be designed so that the usage rate of fuel stored in a subtank of high capcicity is set to a high value.

In either running region, when either of the fuel storage amounts of the subtanks 10, 11 detected by the storage amount sensors 12, 13 exceeds a predetermined upper limiting value, the storage amount of the subtanks 10, 11 may be prevented from becoming excessive by mainly using this fuel.

Alternatively, if the storage amount of the other fuel is greater than the minimum value MIN, the storage amount of the subtanks 10, 11 may be prevented from becoming excessive by stopping fractionation by the fractional distiller 9.

Due to the above process, the consumption of each fuel can be balanced while using fuel of two different octane values obtained by fractionation according to the running region.

The fuel storage amounts of the subtanks 10, 11 are not disproportionate, and the entire amount of the gasoline in the main tank 8 is consumed without waste. Therefore, the self-ignition combustion region can be enlarged by using two types of fuel without increasing the frequency of refueling of the main tank 8, or consuming fuel needlessly, which contributes to reducing fuel consumption and enhancing exhaust gas purification efficiency.

If fuel supply control which takes account of the consumption balance of high octane fuel and low octane fuel is performed and the high octane fuel storage amount QH falls below the minimum value MIN, even if the combustion type of the engine 20 requires high octane fuel, it may occur that high octane fuel is not supplied to the engine 20.

In this case, as only low octane fuel is supplied to the engine 20, the output torque of the engine 20 declines. In such a case, decline in the running performance of the vehicle may be avoided by combining the variable speed control of the automatic transmission 21 with fuel supply control.

Figure 5:
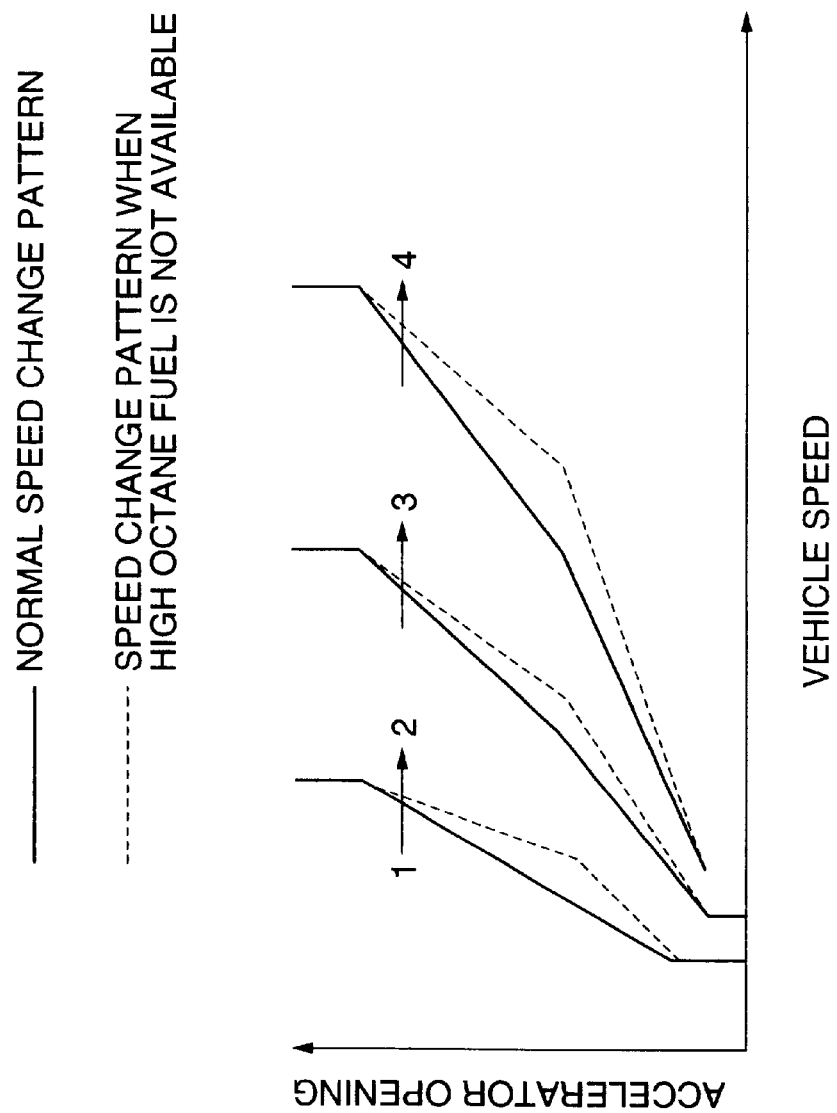
FIG. 5 is a diagram describing a variable speed control of a transmission performed by the controller.

FIG. 5 shows shift-up characteristics when the engine 20 and the automatic transmission 21 are mounted on the vehicle, and high octane fuel and low octane fuel are used under the above-mentioned fuel supply control. The numbers in the figure show the speed range of the automatic transmission, 1 corresponding to first gear and 4 corresponding to top gear.

The solid line in the figure shows the speed change pattern when high octane fuel can be used as needed.

If, although the running region requires the use of high octane fuel, low octane fuel is used due to a shortage of high octane fuel, the controller 1 changes the shift-up characteristic to the characteristics shown by the broken line in the figure. That is, the speed change point is moved from the usual pattern to the high speed side. Due to this change, the decrease of torque accompanying the use of low octane fuel can be compensated, and an acceleration characteristic of the same order as the usual characteristics can be obtained. Although not shown in the figure, the characteristics during a downshift also move the speed change point to the high speed side. Hence, by combining fuel supply control and speed ratio control, decline of the running performance of the vehicle can suppressed while maintaining a good balance of high octane fuel and low octane fuel consumption.

If a continuously variable transmission (CVT) is used instead of an ordinary automatic transmission, the same processing is possible by multiplying the speed ratio obtained according to the accelerator opening and vehicle speed by a fixed coefficient, or by changing over the map which provides the speed ratio.

Figure 8:
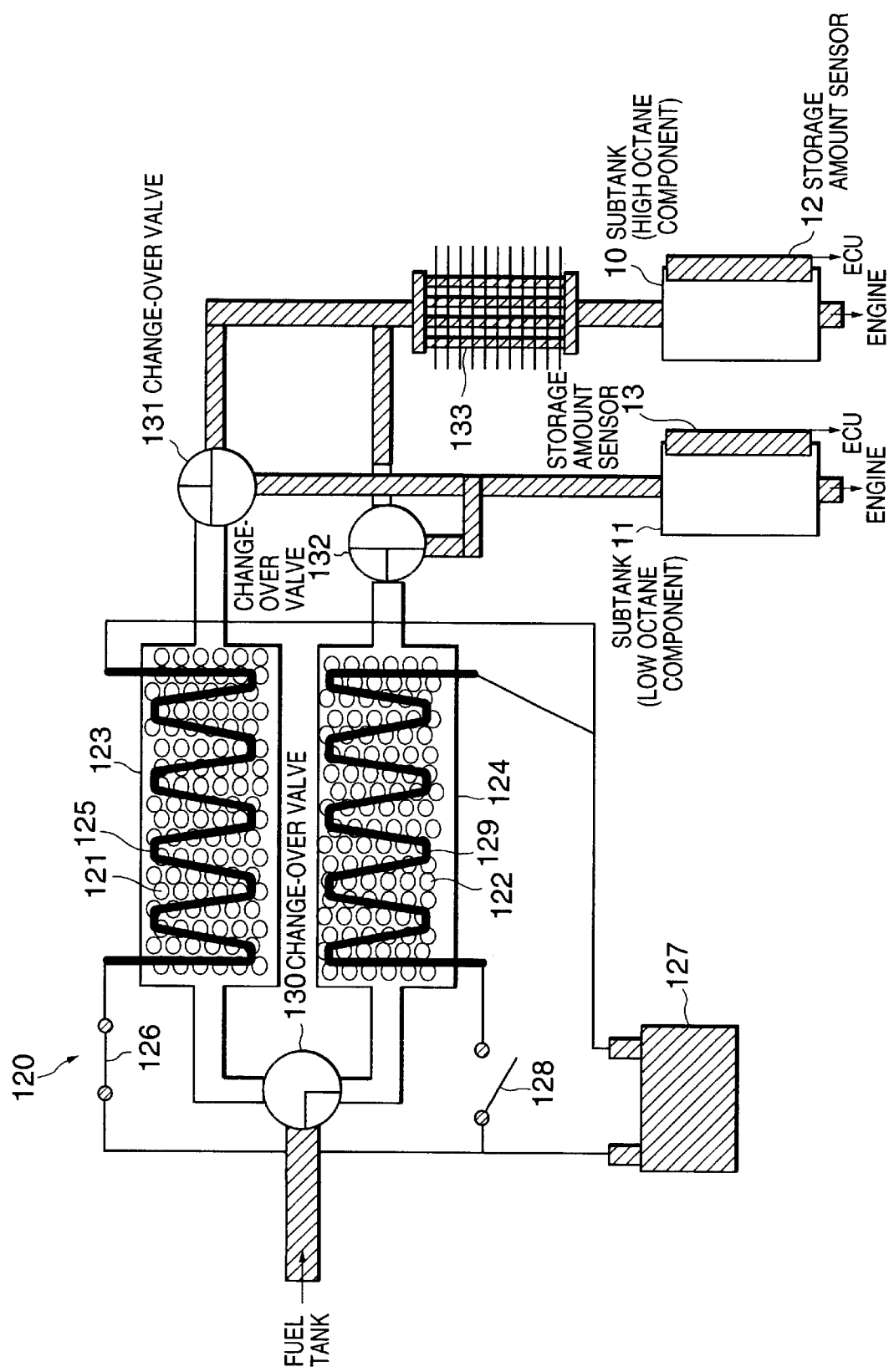
FIG. 8 is a schematic diagram of a separator using silica gel according to this invention.

Another embodiment of this invention relating to separation of gasoline will now be described referring to FIG. 8.

According to this embodiment, gasoline is separated into high octane fuel and low octane fuel by a separator 120 which uses silica gel instead of the fractional distiller 9.

When gasoline contact silica gel, aromatic components of high octane number in the gasoline are adsorbed on the silica gel, and the octane value of the gasoline will decrease. The separator 120 separates gasoline into high octane fuel and low octane fuel using this characteristic.

The separator 120 is provided with a pair of absorbers 123, 124 comprising built-in filters 121, 122 using silica gel as the principal component.

The absorber 123 is provided with an electric heater 125 which generates heat due to the electric power of a battery 127 via a switch 126. The absorber 124 is provided with an electric heater 129 which generates heat due to the electric power of the battery 127 via a switch 128.

The fuel of the main tank, not shown, is supplied selectively to the absorbers 123 and 124 by a change-over valve 130. Fuel which passes through the absorber 123 flows into the subtank 10 which stores high octane fuel or the subtank 11 which stores low octane fuel via a change-over valve 131. An air-cooling cooler 133 is provided in an intake passage to the subtank 10 which stores high octane fuel. Fuel which passes through the absorber 124 flows into the subtank 10 or 11 through a change-over valve 132.

In the figure, the change-over valve 130 makes gasoline flow into the absorber 124. In this state, the electric heater 129 of the absorber 124 is not energized. In the gasoline passing through the silica gel filter 122 in the adsorber 124, aromatic components of high octane fuel are adsorbed on the silica gel, so the fuel becomes low octane fuel which flows out of the adsorber 124. The change-over valve 132 leads this low octane fuel to the subtank 11.

On the other hand, in the absorber 123, the electric heater 125 is energized via the switch 126.

The temperature in the absorber 123 therefore rises, aromatic components of the high octane which the silica gel filter 121 adsorbed vaporize, and escape from the filter 121. These aromatic components are led to the air-cooling cooler 133 via the change-over valve 131 from the adsorber 123, and after being cooled and liquefied by the air-cooling cooler 133, they flow into the subtank 10 as high octane fuel.

When elimination of aromatic components from the filter 121 of the adsorber 123 is complete and the filter 122 of the adsorber 124 has fully adsorbed aromatic components the change-over valves 130, 131, and 132 are changed over. Simultaneously, the switch 126 is switched OFF and the switch 128 is switched ON.

As a result, the gasoline of the main tank is supplied to the adsorber 123 via the change-over valve 130 and after the filter 121 in the adsorber 123 has adsorbed aromatic components, the fuel flows from the change-over valve 131 into the subtank 11 as low octane fuel. On the other hand, in the adsorber 124, aromatic components are eliminated from the filter 122 due to the heat of the electric heater 129. The separated components are led to the air cooler 133 via the change-over valve 132, and after they are liquefied by the air cooler 133, they flow into the subtank 10 as high octane fuel.

Thus, by supplying gasoline to one of the adsorbers 123, 124, and heating the other adsorber in turn, the gasoline can be separated into high octane fuel and low octane fuel.

The contents of Tokugan Hei 11-154089, with a filing date of Jun. 1, 1999 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, in the above embodiments, the gasoline was separated into two kinds of fuel, but it may be separated into more types for use according to need.

In this case, the fractional distiller may for example apply plural fractionation temperatures and store the different fuel types respectively in an identical number of subtanks. Also, in order to use these fuels properly, plural fuel injectors may be used or plural high pressure intermittent injection pumps may be used.

The embodiments of this invention in which an exclusive property or privilege is claimed are defined as follows.

What is claimed is:

1. An apparatus for supplying fuel in a fuel tank to an internal combustion engine, comprising:
   a separating device which separates fuel in the fuel tank into plural fuel components;
   a sensor which detects a running condition of the engine; and
   a mechanism which supplies the plural fuel components to the engine in different proportions depending on the running condition;
   wherein the supply mechanism comprises a microprocessor programmed to determine a proportion of the fuel components supplied to the engine based on the running condition, and a fuel injector which injects the plural fuel components according to the proportion determined by the microprocessor;
   wherein the plural fuel components comprise a high octane fuel component and a low octane fuel component which has a lower octane number than the high octane fuel component, and the sensor comprises a sensor which detects a load of the engine, and a sensor which detects a rotation speed of the engine;
   wherein the engine comprises an engine which performs compression self-ignition, and the microprocessor is further programmed to increase the high octane fuel component in the fuel components supplied to the engine when the load of the engine is in a predetermined first load region, and increase the low octane fuel component in the fuel components supplied to the engine when the load of the engine is in a second load region which corresponds to lower loads than the first load region.

2. The fuel supply apparatus as defined in claim 1, wherein the supply mechanism further comprises a first subtank which stores the high octane fuel component, a second subtank which stores the low octane fuel component, a first sensor which detects a storage amount of the first subtank, and a second sensor which detects a storage amount of the second subtank, and the microprocessor is further programmed to vary the proportion of the fuel components supplied to the engine according to the storage amount of the first subtank and the storage amount of the second subtank.

3. The fuel supply apparatus as defined in claim 2, wherein the microprocessor is further programmed to supply only the low octane fuel component to the engine when the storage amount of the first subtank is equal to or less than a predetermined first amount, while the storage amount of the second subtank is larger than a predetermined second amount.

4. The fuel supply apparatus as defined in claim 2, wherein the engine is connected to an automatic transmission, and the microprocessor is further programmed to supply only the low octane fuel component to the engine when the storage amount of the first subtank is equal to or less than a predetermined first amount, and the storage amount of the second subtank is larger than a predetermined second amount, and to vary the speed change schedule of the automatic transmission in a direction so as to compensate decrease of an output torque of the engine due to use of the low octane fuel component.

5. The fuel supply apparatus as defined in claim 2, wherein the microprocessor is further programmed to supply only the high octane fuel component when the storage amount of the second subtank is equal to or less than the predetermined second amount and the storage amount of the first subtank is larger than the predetermined first amount.

6. The fuel supply apparatus as defined in claim 2, wherein the microprocessor is further programmed to compare the storage amount of the first subtank and the storage amount of the second subtank, and increase the fuel component of a larger storage amount in the fuel components supplied to the engine when the load of the engine is in a region between the first load region and the second load region.

7. The fuel supply apparatus as defined in claim 2, wherein the engine comprises an engine which performs compression self-ignition and spark ignition, and the microprocessor is further programmed to compare the storage amount of the first subtank and the storage amount of the second subtank, and increase the fuel component of a larger storage amount in the fuel components supplied to the engine when the engine performs spark ignition.

8. The fuel supply apparatus as defined in claim 2, wherein the microprocessor is further programmed to increase the low octane fuel component in the fuel components supplied to the engine when the load of the engine is in a predetermined first load region and the storage amount of the first subtank is equal to or less than a predetermined amount, and to control the engine so that the low octane fuel component supplied to the engine causes compression self-ignition.

9. The fuel supply apparatus as defined in claim 8, wherein the engine further comprises a spark plug. and the microprocessor is further programmed to determine whether or not the storage amount of the first subtank has increased after the low octane fuel component in the fuel components supplied to the engine has increased, further increase the low octane fuel component in the fuel components supplied to the engine when the storage amount of the first subtank has not increased, and control the spark plug to perform an auxiliary sparking so as to promote formation of active free radicals in the fuel components supplied to the engine.

10. The fuel supply apparatus as defined in claim 2, wherein the engine comprises a device for modifying the high octane fuel component supplied to the engine, and the microprocessor is further programmed to increase the high octane fuel component in the fuel components supplied to the engine when the load of the engine is in a predetermined load region and the storage amount of the second subtank is equal to or less than a predetermined amount, and to control the modifying device to modify the high octane fuel component supplied to the engine.

11. The fuel supply apparatus as defined in claim 10, wherein the modifying device comprises a spark plug which performs an auxiliary sparking so as to promote formation of active free radicals in the fuel components supplied to the engine.

12. The fuel supply apparatus as defined in claim 10, wherein the engine further comprises a spark plug, and the microprocessor is further programmed to determine whether or not the storage amount of the second subtank has increased after the high octane fuel component in the fuel components supplied to the engine has increased, further increase the high octane fuel component in the fuel components supplied to the engine when the storage amount of the second subtank has not increased, and control the spark plug to perform an auxiliary sparking so as to promote formation of active free radicals in the fuel components supplied to the engine.

13. The fuel supply apparatus as defined in claim 1, wherein the supply mechanism comprises subtanks which store the plural fuel components and which are of identical number to the plural fuel components.

14. The fuel supply apparatus as defined in claim 1, wherein the separating device comprises a separator which separates the fuel into the plural fuel components according to a difference of boiling points of the fuel components in the fuel, and a cooler which liquefies a fuel component separated from the fuel.

15. The fuel supply apparatus as defined in claim 2, wherein the separating device comprises plural adsorbers each of which comprises a filter using silica gel which adsorbs the high octane fuel component in the fuel, and a heater which vaporizes the high octane fuel component adsorbed by the filter by heating so as to separate the high octane fuel component from the filter.

16. The fuel supply apparatus as defined in claim 15, wherein the separating device further comprises a valve which causes a fuel component remaining after the high octane fuel component has been removed by the filter to flow into the subtank and causes the high octane fuel component separated from the filter to flow into the first subtank, and a cooler which liquefies the high octane fuel component flowing into the first subtank.

* * * * *